US005622801A

United States Patent [19]
Nukada et al.

[11] Patent Number: 5,622,801
[45] Date of Patent: Apr. 22, 1997

[54] PHTHALOCYANINE PIGMENT AND DISPERSION THEREOF AND ELECTROPHOTOGRAPHIC PHOTORECEPTOR CONTAINING THE PIGMENT

[75] Inventors: Hidemi Nukada; Takahiro Suzuki; Katsumi Nukada; Katsumi Daimon; Yasuo Sakaguchi, all of Minami-ashigara, Japan

[73] Assignee: Fuji Xerox Co., Ltd, Tokyo, Japan

[21] Appl. No.: 539,045

[22] Filed: Oct. 4, 1995

Related U.S. Application Data

[63] Continuation of Ser. No. 181,429, Jan. 14, 1994, abandoned.

[30] Foreign Application Priority Data

Jan. 14, 1993 [JP] Japan ................................. 5-020812

[51] Int. Cl.$^6$ ......................... G03G 5/047; C08L 101/00
[52] U.S. Cl. ............................... 430/58; 430/56; 430/77; 430/78; 524/88
[58] Field of Search .................... 430/58, 78, 76, 430/77, 56; 524/88

[56] References Cited

U.S. PATENT DOCUMENTS

| | | | |
|---|---|---|---|
| 4,311,775 | 1/1982 | Regan | 430/78 |
| 4,557,989 | 12/1985 | Branston et al. | 430/59 |
| 4,971,877 | 11/1990 | Miyamoto et al. | 430/58 |
| 5,079,119 | 1/1992 | Suzuki et al. | 430/59 |
| 5,234,785 | 8/1993 | Itami et al. | 430/58 |

FOREIGN PATENT DOCUMENTS

| | | |
|---|---|---|
| 55-127565 | 10/1980 | Japan . |
| 59-19946 | 2/1984 | Japan . |
| 59-214858 | 12/1984 | Japan . |
| 60-130745 | 7/1985 | Japan . |
| 60-216354 | 10/1985 | Japan . |

OTHER PUBLICATIONS

Patent & Trademark English-Language Translation of JP 59-214858 (Pub Dec. 1984).
Patent & Trademark English-Language Translation of JP 60-216354.
Patent & Trademark Office English Translation of Japanese Patent 55-127565 (Pub Oct. 1980).
Patent & Trademark Office English Translation of Japanese Patent 60-130745 (Pub Jul. 1985).
Patent & Trademark Office English Translation of Japanese Patent 59-019946 (Pub Feb. 1984).
English Abstract of Japanese Patent 60-130745 Pub. Date Jul. 12, 1985.
English Abstract of Japanese Patent 59-19946 (Pub Date Feb. 1, 1984).
Kazumasa Watanabe et al., "Formations and Characteristics of Titanyl Phthalocyanine Crystals Containing Diol Compounds," *Japan Hard Copy '92 (1992)*, pp. 153–156.

*Primary Examiner*—Janis L. Dote
*Attorney, Agent, or Firm*—Oliff & Berridge

[57] ABSTRACT

An electrophotographic photoreceptor comprising a conductive substrate having thereon a photosensitive layer, the photosensitive layer containing a hydroxymetal or hydroxysilicon phthalocyanine pigment represented by formula (I) as a charge generating material, the phthalocyanine pigment having been treated with an organometallic compound having a hydrolyzable functional group or a hydrolysis product thereof:

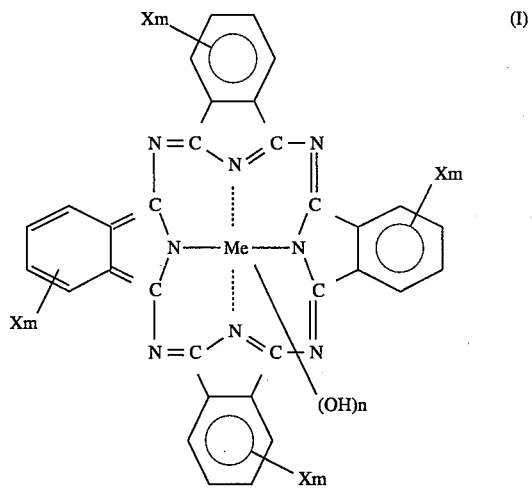

wherein Me represents Al, Ga, In, Si, Ge or Sn; X represents H, Cl, Br or I; m represents an integer of from 1 to 4; and n represents 1 where Me is Al, Ga or In, or 2 where Me is Si, Ge or Sn.

19 Claims, 8 Drawing Sheets

PHTHALOCYANINE PIGMENT AND DISPERSION THEREOF AND ELECTROPHOTOGRAPHIC PHOTORECEPTOR CONTAINING THE PIGMENT

This is a continuation of application Ser. No. 08/181,429 filed Jan. 14, 1994, now abandoned.

FILED OF THE INVENTION

The present invention relates to an electrophotographic photoreceptor containing a hydroxymetal or hydroxysilicon phthalocyanine pigment as a photoconductive material, and particularly relates to a phthalocyanine pigment coated with an organometallic compound having a hydrolyzable functional group or a hydrolysis product thereof, and a dispersion containing the phthalocyanine pigment.

BACKGROUND OF THE INVENTION

Phthalocyanine compounds are useful as paints, printing inks, catalysts, and electronic materials. In recent years, they have been extensively studied particularly for their use as electrophotographic photoreceptor materials, optical recording materials and photoelectric conversion materials.

Electrophotographic photoreceptors using a hydroxymetal phthalocyanine pigment, such as dihydroxygermanium phthalocyanine, dihydroxytin phthalocyanine or dihydroxysilicon phthalocyanine, are disclosed, e.g., in U.S. Pat. No. 4,557,989.

Application of an organometallic compound having a hydrolyzable functional group or a hydrolysis product thereof to an electrophotographic photoreceptor using a phthalocyanine compound is reported in JP-A-55-127565 (the term "JP-A" as used herein means an "unexamined published Japanese patent application"), JP-A-59-19946, and JP-A-60-130745. Application of a titanium coupling agent to hydroxytitanyl phthalocyanine is mentioned in *Japan Hard Copy* '92, pgs. 153–156 (1992) while the report says that the application has no effect on electrophotographic properties of the phthalocyanine compound. Any of these reports makes no mention of application of an organometallic compound having a hydrolyzable functional group or a hydrolysis product thereof to a hydroxymetal or hydroxysilicon phthalocyanine pigment.

Where a hydroxymetal or hydroxysilicon phthalocyanine is dispersed in a binder resin in a usual manner for the production of an electrophotographic photoreceptor, it has poor dispersibility only to provide a pigment dispersion having insufficient coating properties and insufficient preservability for forming a smooth coating film. The resulting photoreceptor fails to exhibit satisfactory reproducibility of electric characteristics and tends to cause image defects, such as fog and black spots.

SUMMARY OF THE INVENTION

An object of the present invention is to provide a hydroxymetal or hydroxysilicon phthalocyanine pigment having improved dispersibility.

Another object of the present invention is to provide a dispersion of a hydroxymetal or hydroxysilicon phthalocyanine pigment having improved coating properties and improved preservability.

A further object of the present invention is to provide an electrophotographic photoreceptor excellent in sensitivity characteristics, charge retention properties, and image characteristics.

Other objects and effects of the present invention will be apparent from the following description.

The present inventors have noted that a hydroxymetal or hydroxysilicon phthalocyanine has poor dispersion stability in organic solvents because of their hydrophilic hydroxyl group, and they have conducted extensive studies on treatment of a hydroxymetal or hydroxysilicon phthalocyanine for rendering hydrophobic and thereby compatible with an organic solvent. As a result, it has now been found that an organometallic compound having a hydrolyzable functional group or a hydrolysis product thereof serves as a surface treating agent and/or a dispersion stabilizer for a hydroxymetal or hydroxysilicon phthalocyanine pigment, and provides a hydroxymetal or hydroxysilicon phthalocyanine pigment and its dispersion excellent in dispersibility, coating properties, and preservability, thereby making it feasible to produce a hydroxymetal or hydroxysilicon phthalocyanine-containing electrophotographic photoreceptor excellent in sensitivity characteristics, charge retention properties, and image characteristics. The present invention has been completed based on this finding.

The present invention relates to an electrophotographic photoreceptor comprising a conductive substrate having thereon a photosensitive layer, the photosensitive layer containing a hydroxymetal or hydroxysilicon phthalocyanine pigment represented by formula (I) as a charge generating material, the phthalocyanine pigment having being treated with an organometallic compound having a hydrolyzable functional group or a hydrolysis product thereof:

wherein Me represents Al, Ga, In, Si, Ge or Sn, with Ga being preferred; X represents H, Cl, Br or I; m represents an integer of from 1 to 4; and n represents 1 where Me is Al, Ga or In, or 2 where Me is Si, Ge or Sn.

The present invention also relates to a phthalocyanine pigment for electrophotographic photoreceptors having been treated with an organometallic compound having a hydrolyzable functional group or a hydrolysis product thereof.

The present invention further relates to a pigment dispersion for electrophotographic photoreceptors comprising a binder resin, a solvent, and a hydroxymetal or hydroxysilicon phthalocyanine pigment having been treated with an organometallic compound having a hydrolyzable functional group or a hydrolysis product thereof.

The organometallic compound having a hydrolyzable functional group or a hydrolysis product thereof may be simply coated on the surface of the hydroxymetal or hydroxysilicon phthalocyanine pigment, and it is preferred that at least part of the organometallic compound having a hydrolyzable functional group or a hydrolysis product thereof is chemically bonded to the hydroxymetal or hydroxysilicon phthalocyanine pigment.

DETAILED DESCRIPTION OF THE INVENTION

The photosensitive layer of the electrophotographic photoreceptor of the present invention may have either a single layer structure or a laminate structure composed of a charge generating layer and a charge transporting layer. In the latter structure, the hydroxymetal or hydroxysilicon phthalocyanine pigment having been treated with an organometallic compound having a hydrolyzable functional group or a hydrolysis product thereof constitutes the charge generating layer together with a binder resin. In the former structure, the photosensitive layer comprises both the above-mentioned components constituting the charge generating layer and a charge transporting material.

Figure 1:
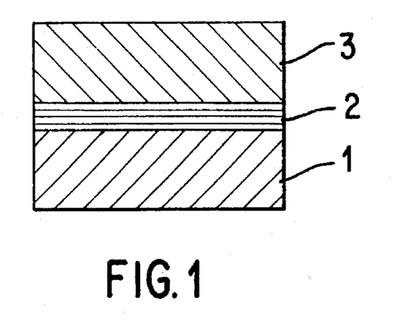
FIGS. 1 to 4 each show a schematic cross section of an electrophotographic photoreceptor according to one embodiment of the present invention, in which the photosensitive layer has a laminate structure.
Figure 2:
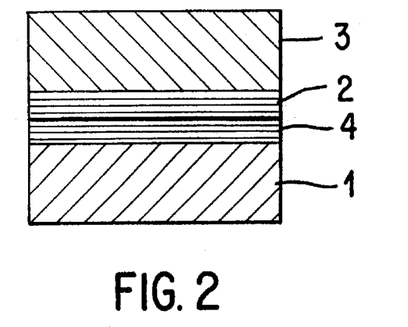
Figure 3:
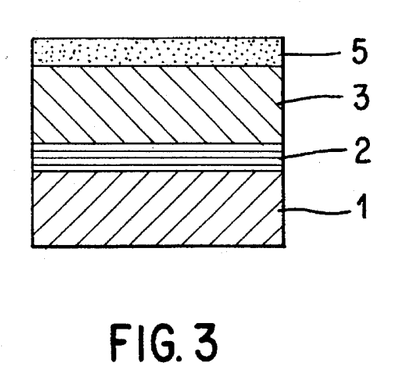
Figure 4:
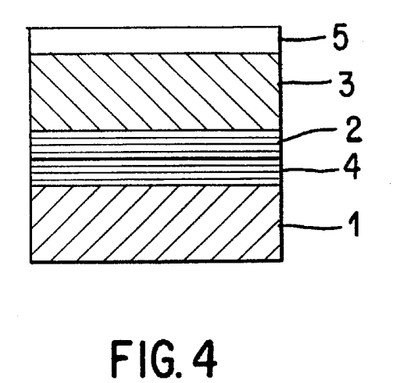

FIGS. 1 through 6 each show a schematic cross section of the laminate type photoreceptor embodying the present invention. The photoreceptor of FIG. 1 comprises conductive substrate 1 having provided thereon charge generating layer 2 and charge transporting layer 3 in this order. Subbing layer 4 may be provided between charge generating layer 2 and conductive substrate 1 as shown in FIG. 2. Protective layer 5 may be provided on the surface of charge transport-ing layer 3 as shown in FIG. 3. The photoreceptor of FIG. 4 has both subbing layer 4 and protective layer 5.

Figure 5:
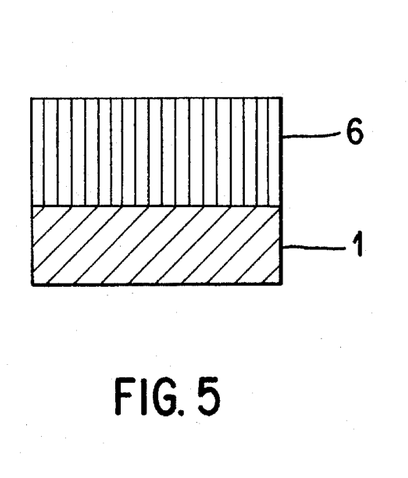
FIGS. 5 to 6 each show a schematic cross section of an electrophotographic photoreceptor according to one embodiment of the present invention, in which the photosensitive layer has a single layer structure.
Figure 6:
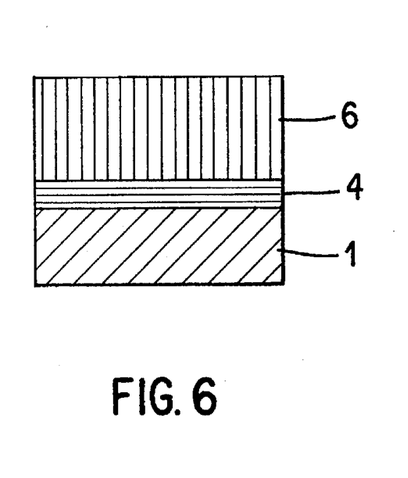

FIGS. 5 and 6 each show a schematic cross section of the photoreceptor having a single layer structure embodying the present invention. The photoreceptor of FIG. 5 comprises conductive substrate 1 having provided thereon photoconductive layer (photosensitive layer) 6. The photoreceptor of FIG. 6 additionally comprises subbing layer 4 between photoconductive layer 6 and support 1.

The photoreceptor of the present invention will further be explained below chiefly with reference to those having the laminate structure.

Any conductive substrate known useful in electrophotographic photoreceptors can be used in the present invention. Examples of the substrates include metals, e.g., aluminum, nickel, chromium, and stainless steel; plastic films having thereon a thin film of aluminum, titanium, nickel, chromium, stainless steel, gold, vanadium, tin oxide, indium oxide, indium-tin oxide (ITO), etc.; and paper or plastic films having coated thereon or impregnated therein a conductivity imparting agent. While not limiting, the conductive substrate usually has a shape of a drum, a sheet or a plate.

If desired, the surface of the conductive substrate may be subjected to various surface treatments as far as the image quality is not impaired. For example, it may be subjected to an oxidation treatment, a chemical treatment, a coloring treatment, or a non-specular finish, such as graining.

If desired, a subbing layer may be provided between a conductive substrate and a photosensitive layer. A subbing layer functions to prevent injection of unnecessary charges from a conductive substrate into a photosensitive layer on charging of the photosensitive layer. It also serves as an adhesive layer for adhesion between a conductive substrate and a photosensitive layer. A subbing layer may be effective to prevent light reflection on a conductive substrate.

Materials for constituting a subbing layer may be any known materials, which include polyethylene resins, polypropylene resins, acrylic resins, methacrylic resins, polyamide resins, vinyl chloride resins, vinyl acetate resins, phenol resins, polycarbonate resins, polyurethane resins, polyimide resins, vinylidene chloride resins, polyvinyl acetal resins, vinyl chloride-vinyl acetate copolymers, polyvinyl alcohol resins, water-soluble polyester resins, nitrocellulose, casein, gelatin, polyglutamic acid, starch, starch acetate, amino starch, polyacrylic acid resins, polyacrylamide resins, organozirconium compounds (e.g., zirconium chelate compounds and zirconium alkoxide compounds), organotitanium compounds (e.g., titanyl chelate compounds and titanium alkoxide compounds), and organometallic compounds having a hydrolyzable functional group or a hydrolysis product thereof.

Coating of a subbing layer can be carried out in a usual manner, for example, blade coating, wire bar coating, spray coating, dip coating, bead coating, air knife coating, and curtain coating. A subbing layer usually has a thickness of from 0.01 to 10 μm, and preferably from 0.05 to 2 μm.

A charge generating layer is formed by coating, on a conductive substrate or a subbing layer, a coating composition prepared by dissolving a binder resin in an organic solvent and dispersing the hydroxymetal phthalocyanine pigment of formula (I) as a charge generating material in the resin solution.

The hydroxymetal or hydroxysilicon phthalocyanine pigment to be used may be the one synthesized by a known process or the one obtained by subjecting the synthetically prepared hydroxymetal or hydroxysilicon phthalocyanine crystals to a solvent treatment.

The solvent treatment can be carried out by mechanically stirring a hydroxymetal or hydroxysilicon phthalocyanine and a solvent, or by wet grinding them in a ball mill, a mortar, a sand mill, a kneader, etc. The solvent treatment may be preceded by dry grinding of a hydroxymetal or hydroxysilicon phthalocyanine in the absence of a solvent.

The solvent which can be used for the solvent treatment can be selected from amides (e.g., dimethylformamide, dimethylacetamide, and N-methylpyrrolidone), esters (e.g., ethyl acetate, butyl acetate, and methyl propionate), ketones (e.g., acetone, methyl ethyl ketone, and cyclohexanone), alcohols (e.g., methanol, ethanol, and benzyl alcohol), mixtures of two or more of these organic solvents, and mixtures of these solvents and water. If desired, the grinding may be effected with grinding aids, such as sodium chloride and sodium sulfate (salt cake).

Binder resins which can be used in the charge generating layer is not particularly limited and can be chosen from a broad range of insulating resins, such as polyvinyl butyral resins, polyarylate resins (e.g., a polycondensate of bisphenol A and phthalic acid), polycarbonate resins, polyester resins, phenoxy resins, vinyl chloride-vinyl acetate copolymers, polyamide resins, acrylic resins, polyacrylamide resins, polyvinyl pyridine resins, cellulose resins, polyurethane resins, epoxy resins, casein, polyvinyl alcohol resins, and polyvinyl pyrrolidone resins. Organic photoconductive polymers, such as poly-N-vinylcarbazole, polyvinyl anthracene, polyvinylpyrene, and polysilane, can also be used. These binder resins may be used either individually or in combination of two or more thereof.

Solvents which can be used for dissolving the binder resin and for dispersing the hydroxymetal or hydroxysilicon phthalocyanine pigment in the binder resin include methanol, ethanol, n-propanol, n-butanol, benzyl alcohol, acetone, methyl ethyl ketone, cyclohexanone, ethyl acetate, n-butyl acetate, dioxane, tetrahydrofuran, methyl cellosolve, ethyl cellosolve, methylene chloride, chloroform, toluene, xylene, and monochlorobenzene. These organic solvents may be used either individually or in combination of two or more thereof.

A preferred examples of the organometallic compound having a hydrolyzable functional group which can be used in the present invention is represented by formula (II):

$$R_p Me'Y_q \qquad (II)$$

wherein R represents an organic group; Me' represents a metal or silicon; Y represents a hydrolyzable functional group; and p and q each represent an integer of from 1 to 4, with the sum of them corresponding to the valence of Me'.

The organic group as represented by R is not particularly limited and includes alkyl groups, e.g., a methyl group, an ethyl group, a propyl group, a butyl group, and an octyl group; alkenyl groups, e.g., a vinyl group and an allyl group; cycloalkyl groups, e.g., a cyclohexyl group; aryl groups, e.g., a phenyl group and a naphthyl group; alkaryl groups, e.g., a tolyl group; aralkyl groups, e.g., a benzyl group and a phenylethyl group; arylalkenyl groups, e.g., a styryl group; heterocyclic groups, e.g., a furyl group, a thienyl group, a pyrrolidinyl group, a pyridyl, and an imidazolyl group; an epoxy group; a methacryloxy group; an amino group; a mercapto group; and a chloropropyl group. Among these, a vinyl group, an epoxy group, a methacryloxy group, an amino group, a mercapto group, and a chloropropyl group are preferred, with a methacryloxy group, an epoxy group, and a mercapto group being more preferred. The organic group may have one or more substituents, such as hydrolyzable groups, e.g., a hydroxyl group, an alkoxy group, and a halogen atom.

Specific examples of the hydrolyzable functional group as represented by Y include an ether group, e.g., a methoxy group, an ethoxy group, a propoxy group, a butoxy group, a cyclohexyloxy group, a phenoxy group or a benzyloxy group; an ester group, e.g., an acetoxy group, a propionyloxy group, an acryloxy group, a methacryloxy group, a benzoyloxy group, a methanesulfonyloxy group, a benzenesulfonyloxy group or a benzyloxycarbonyl group; and a halogen atom, e.g., a chlorine atom. Among the above, an alkoxy group, e.g., a methoxy group, an ethoxy group, and a propoxy group; and a halogen atom are preferred, with an alkoxy group being more preferred, and a methoxy group, an ethoxy group being particularly preferred.

Me' is silicon or any metal except an alkali metal, with titanium, aluminum, zirconium, and silicon being preferred.

Examples of the organometallic compound of formula (II) include organotitanium compounds, organoaluminum compounds, organozirconium compounds and silane coupling agents having the above-mentioned organic group and hydrolyzable functional group.

A hydrolysis product of the above-mentioned organometallic compound can also serve as a surface treating agent as well. The hydrolysis product is a compound in which the hydrolyzable organic group Y on the metal atom Me' or the hydrolyzable group substituted on the organic group R. Where the organometallic compound has two or more hydrolyzable functional groups, not all of these functional groups need to be hydrolyzed.

The organometallic compounds and their hydrolysis product may be used either individually or in combination of two or more thereof.

The organometallic compound or its hydrolysis product (hereinafter inclusively referred to an organometallic compound) functions to treat the surface of a hydroxymetal phthalocyanine pigment to render it hydrophobic. The surface treatment may be carried out by, for example, previously coating the phthalocyanine pigment with the organometallic compound prior to dispersing in a binder resin, mixing the organometallic compound with the phthalocyanine pigment at the time of dispersing in a binder resin, or dispersing the organometallic compound in the phthalocyanine pigment dispersion in a binder resin. The first method, i.e., previous coating is preferred.

Previous coating before dispersing can be performed by, for example, a method of mixing a hydroxymetal or hydroxysilicon phthalocyanine pigment and a mixture of an organometallic compound and water or an organic solvent and heating the mixture; a method of directly atomizing an organometallic compound onto a hydroxymetal or hydroxysilicon phthalocyanine pigment; or a method of milling a hydroxymetal or hydroxysilicon phthalocyanine pigment together with an organometallic compound. The second method, i.e., mixing at the time of dispersing can be effected by, for example, successively adding an organometallic compound, a hydroxymetal or hydroxysilicon phthalocyanine pigment and a binder resin to a dispersion medium or a method of mixing all of these charge generating layer-forming components at a time. The third method, i.e., dispersing in a phthalocyanine pigment dispersion can be conducted by, for example, adding an organometallic compound diluted with a solvent to a phthalocyanine pigment dispersion followed by stirring.

If desired, in order to ensure adhesion of the organometallic compound onto phthalocyanine pigment particles, an acid, such as sulfuric acid, hydrochloric acid or trifluoroacetic acid, may be added as a catalyst.

The organometallic compound may be present in any form with respect to the hydroxymetal or hydroxysilicon phthalocyanine pigment, as a result of the treatment. The organometallic compound may be simply coated on the surface of the hydroxymetal or hydroxysilicon phthalocyanine pigment or may be chemically bonded through a coupling reaction with the hydroxyl group (hydrophilic group) exposed on the surface of the pigment or the surface of an agglomerate of the pigment. For example, (1) a monomer of the organometallic compound may be chemically bonded to the pigment, (2) a polymer or oligomer of the organometallic compound may be chemically bonded to the pigment, (3) a polymer or oligomer of the organometallic compound may be coated on the surface of the pigment, (4) a polymer or oligomer of the organometallic compound may be coated on the surface of an agglomerate of the pigment, and (5) organometallic compound molecules, which are chemically bonded to the pigment, or coated on the surface of the pigment or the surface of an agglomerate of the pigment, are chemically bonded to each other.

Among the above modes, (1), (2), and (5) are preferred, and it is preferred that at least part of the organometallic compound is chemically bonded to the pigment. Accordingly, the present invention relates to an electrophotographic photoreceptor comprising a conductive substrate having thereon a photosensitive layer, the photosensitive layer containing a hydroxymetal or hydroxysilicon phthalocyanine pigment represented by formula (III) as a charge generating material:

wherein Me, X, m, R, Me', p, and q have the same meanings as in formulae (I) and (II); n represents 1 where Me is Al, Ga or In, or 2 where Me is Si, Ge or Sn; and Y' represents a residual group of the hydrolyzable functional group represented by Y in formula (II), and preferably an oxygen atom. At least one of the group Y' is bonded to the central metal or silicon of one molecule of the pigment. Other group(s) Y' may be bonded to the central metal or silicon of the same molecule of the pigment (when n=2), may be bonded to the central metal or silicon of the other molecules of the pigment, or may be bonded to the metal contained in other organometallic compounds.

The organometallic compound is used in an amount of from 0.001 to 0.3 part by weight, and preferably from 0.01 to 0.2 part by weight, per part by weight of a hydroxymetal or hydroxysilicon phthalocyanine pigment. If the amount of the organometallic compound is less than 0.001 part, the dispersion stability of the pigment and the coating properties of the coating composition cannot be improved sufficiently. If it is more than 0.3 part, the electric characteristics or image characteristics of the resulting electrophotographic photoreceptor may be adversely affected. The compounding ratio of the hydroxymetal or hydroxysilicon phthalocyanine pigment to the binder resin is preferably from 10/1 to 1/10 by weight, and more preferably from 4/6 to 7/3 by weight.

The hydroxymetal or hydroxysilicon phthalocyanine pigment, either after or before the treatment with an organometallic compound, can be dispersed in a binder resin solution by a general means, e.g., a ball mill, an attritor or a sand mill, to prepare a pigment dispersion for electrophotographic photoreceptor according to the present invention. It is essential that the crystal form of the hydroxymetal or hydroxysilicon phthalocyanine is not changed by the dispersing operation. The inventors have confirmed by way of Examples hereinafter described that the crystal form undergoes no change by any of the above-mentioned dispersion methods. It is preferred to finely disperse the pigment particles to a particle size of not greater than 0.5 μm, preferably not greater than 0.3 μm, and more preferably non greater than 0.15 μm.

In the dispersion, the ratio of the solid content (including the pigment, the binder resin, a dispersion aid, etc.) to the solvent is generally from 1/50 to 1/5 by weight, and preferably 1/40 to 1/10 by weight.

The coating composition (dispersion) for forming a charge generating layer is coated by any of commonly employed coating techniques, such as blade coating, wire bar coating, spray coating, dip coating, bead coating, air knife coating, and curtain coating. The charge generating layer usually has a thickness of from 0.05 to 5 μm, and preferably from 0.1 to 2.0 μm.

A charge transporting layer is formed by coating a coating composition comprising a charge transporting material, a binder resin, and a solvent on the charge generating layer. Any of known charge transporting materials can be used. Examples of the charge transporting materials include oxadiazole derivatives, e.g., 2,5-bis(p-diethylaminophenyl)-1,3,4-oxadiazole; pyrazoline derivatives, e.g., 1,3,5-triphenylpyrazoline and 1-[pyridyl-(2)]-3-(p-diethylaminostyryl)-5-(p-diethylaminophenyl)pyrazoline; aromatic tertiary monoamine compounds, e.g., triphenylamine and dibenzylaniline; aromatic tertiary diamine compounds, e.g., N,N'-diphenyl-N,N'-bis(m-tolyl)benzidine; 1,2,4-triazine derivatives, e.g., 3-(p-diethylaminophenyl)-5,6-di-(p-methoxyphenyl)-1,2,4-triazine; hydrazone derivatives, e.g., 4-diethylaminobenzaldehyde 2,2'-diphenylhydrazone; quinazoline derivatives, e.g., 2-phenyl-4-styrylquinazoline; benzofuran derivatives, e.g., 6-hydroxy-2,3-di-(p-methoxyphenyl)benzofuran; -αstilbene derivatives, e.g., p-(2,2'-diphenylvinyl)-N,N-diphenylaniline; enamine derivatives described in *Journal of Imaging Science*, Vol. 29, pp.7–10 (1985); carbazole derivatives, e.g., N-ethylcarbazole, poly-N-vinylcarbazole, and poly-γ-carbazole ethyl glutamate; pyrene; polyvinylpyrene, polyvinylanthracene, polyvinylacridine, poly-9-vinylphenylanthracene, pyrene-formaldehyde resins, and ethylcarbazole-formaldehyde resins. These charge transporting materials may be used either individually or in combination of two or more thereof.

Binder resins which can be used in the charge transporting layer can be selected from known binder resins, such as polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, and poly-N-vinylcarbazole resins. These binder resins may be used either individually or in combination of two or more thereof. In using a polymeric charge transporting material, it may serve as a film-forming binder resin by itself.

Solvents which can be used for forming a charge transporting layer include aromatic hydrocarbons, e.g., benzene, toluene, and xylene; halogenated hydrocarbons, e.g., monochlorobenzene; ketones, e.g., acetone and methyl ethyl ketone; halogenated aliphatic hydrocarbons, e.g., methylene chloride, chloroform, and ethylene chloride; cyclic or acyclic ethers, e.g., tetrahydrofuran and ethyl ether; and mixtures of two or more thereof.

The weight ratio of the charge transporting material to the binder resin is generally from 10/1 to 1/5. The same coating technique as described above for formation of the charge generating layer may apply to the charge transporting layer. The charge transporting layer usually has a thickness of from 5 to 50 μm, and preferably of from 10 to 30 μm.

Where an electrophotographic photoreceptor of the present invention has a single layer structure, the photosensitive layer is a photoconductive layer comprising a binder resin having dispersed therein a hydroxymetal phthalocyanine pigment having been treated (coated, mixed or dispersed) with an organometallic compound and a charge transporting material. The same kinds of the charge transporting material, binder resin and solvent and the same coating technique as described above with respect to the laminate structure may apply to the single layer structure. In this case, the weight ratio of a hydroxymetal phthalocyanine pigment to a charge transporting material generally ranges from 1/10 to 10/1. The compounding ratio of the hydroxymetal phthalocyanine pigment or the charge transporting material and the binder resin may be selected from the above-mentioned ranges.

The present invention will now be illustrated in greater detail with reference to Synthesis Examples and Examples, but it should be understood that the present invention is not deemed to be limited thereto. All the parts and percents are by weight unless otherwise indicated.

SYNTHESIS EXAMPLE 1

Synthesis of Hydroxyaluminum Phthalocyanine

To 185 parts of quinoline were added 30 parts of 1,3-diiminoisoindoline and 7 parts of aluminum chloride, and the mixture was allowed to react at 200° C. for 3 hours. The reaction product was collected by filtration, washed with acetone and methanol and dried to obtain 24 parts of chloroaluminum phthalocyanine.

Three parts of the resulting crystal were dissolved in 60 parts of concentrated sulfuric acid at 0° C., and the solution was slowly added dropwise to 450 parts of distilled water kept at 5° C. to precipitate crystals. The precipitate was washed successively with distilled water and diluted aqueous ammonia and dried to obtain 2.5 parts of hydroxyaluminum phthalocyanine.

Figure 7:
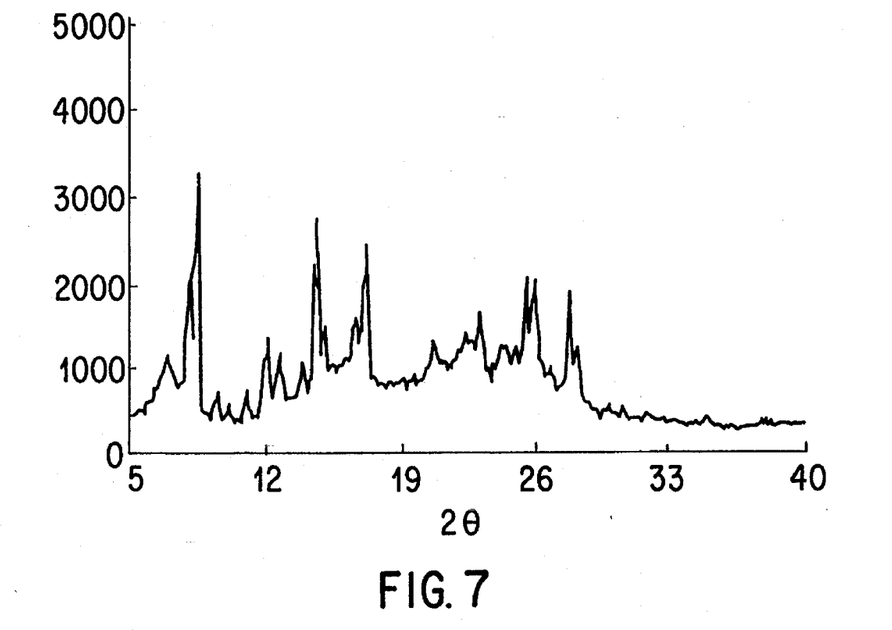
FIG. 7 is a powder X-ray diffraction pattern of the hydroxyaluminum phthalocyanine crystal obtained in Synthesis Example 1.

The resulting crystal was ground in an automatic mortar for 5 hours to obtain amorphous hydroxyaluminum phthalocyanine. Two parts of the amorphous hydroxyaluminum phthalocyanine were milled in 60 parts of ethylene glycol together with 100 parts of glass beads having a diameter of 1 mm in a ball mill for 24 hours, followed by filtration. The filter cake was washed with methanol and dried to recover 1.8 parts of hydroxyaluminum phthalocyanine crystals. The powder X-ray diffraction pattern of the crystal is shown in FIG. 7.

SYNTHESIS EXAMPLE 2

Synthesis of Hydoxyindium Phthalocyanine

To 230 parts of quinoline were added 30 parts of 1,3-diiminoisoindoline and 11.4 parts of indium trichloride, and the mixture was allowed to react at 200° C. for 3 hours. The reaction product was collected by filtration, washed successively with acetone and methanol and dried to obtain 29 parts of chloroindium phthalocyanine.

Six parts of the resulting crystal were dissolved in a mixture of 3 parts of sodium hydroxide, 36 parts of pyridine, and 140 parts of distilled water, and the mixture was heat-refluxed for 30 hours. The thus formed crystals were collected by filtration, washed with distilled water and dried to obtain 3.6 parts of hydroxyindium phthalocyanine.

Figure 8:
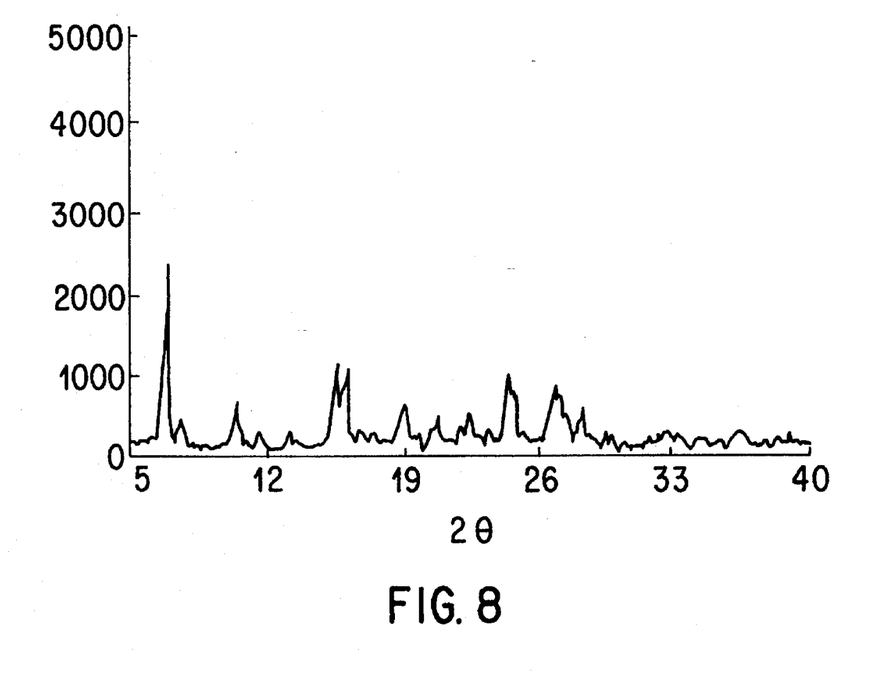
FIG. 8 is a powder X-ray diffraction pattern of the hydroxyindium phthalocyanine crystal obtained in Synthesis Example 2.

The resulting crystal was ground in an automatic mortar for 6 hours to obtain amorphous hydroxyindium phthalocyanine. Two parts of the amorphous hydroxyindium phthalocyanine were milled in 60 parts of methylene chloride together with 120 parts of glass beads having a diameter of 1 mm in a ball mill for 24 hours, followed by filtration. The filter cake was washed with methylene chloride and dried to recover 1.5 parts of hydroxyindium phthalocyanine crystals. The powder X-ray diffraction pattern of the crystal is shown in FIG. 8.

SYNTHESIS EXAMPLE 3

Synthesis of Hydroxygallium Phthalocyanine

To 1,500 parts by volume of α-chloronaphthalene were added 100 parts of gallium trichloride and 291 parts of phthalonitrile, and the mixture was allowed to react at 200° C. for 4 hours in a nitrogen stream. The reaction product was collected by filtration and dispersed in 1,000 parts by volume of dimethylformamide (DMF) and heated at 150° C. for 30 minutes with stirring, followed by filtration. The wet cake was thoroughly washed with methanol and dried to obtain 156 parts of chlorogallium phthalocyanine crystals.

Figure 9:
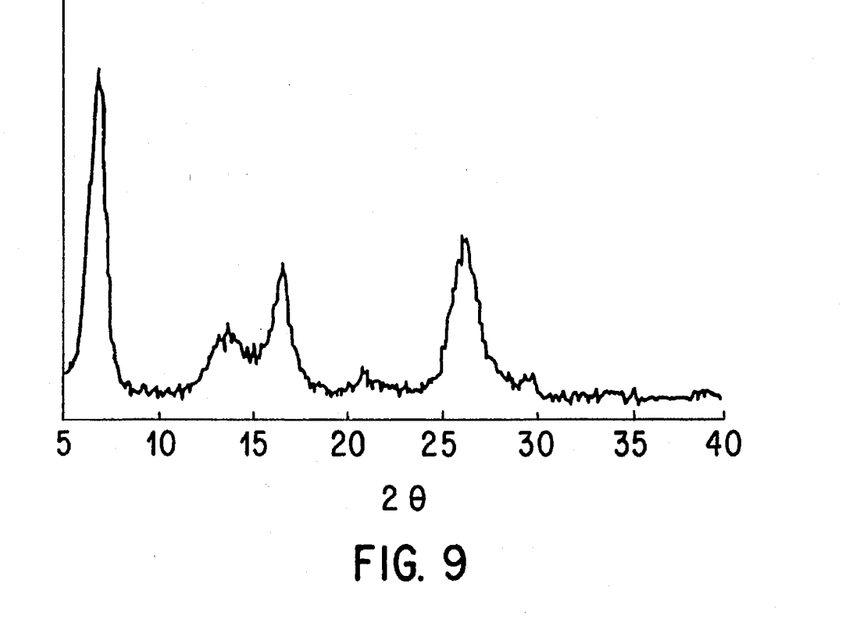
FIGS. 9 through 15 are each a powder X-ray diffraction pattern of the hydroxygallium phthalocyanine crystal obtained in Synthesis Examples 3 to 9, respectively.

Six parts of the resulting crystal were dissolved in 180 parts of concentrated sulfuric acid at 0° C., and the solution was added dropwise to 900 parts of distilled water at 5° C. to precipitate crystals. The precipitate was thoroughly washed with distilled water, suspended in 200 parts by volume of 2% aqueous ammonia, and stirred at room temperature for 1 hour. The precipitate was thoroughly washed with distilled water and dried to recover 5.1 parts of hydroxygallium phthalocyanine crystals. The powder X-ray diffraction pattern of the crystal is shown in FIG. 9.

SYNTHESIS EXAMPLE 4 TO 8

Two parts of the chlorogallium phthalocyanine obtained in Synthesis Example 3 were milled in 60 parts of the solvent shown in Table 1 below together with 120 parts of glass beads (diameter: 1 mm) in a ball mill at 24 hours. The crystals were separated, washed with methanol, and dried to obtain hydroxygallium phthalocyanine crystals. A powder X-ray diffraction pattern of the resulting crystal is shown in FIGS. 10 to 14.

TABLE 1

Figure 10:
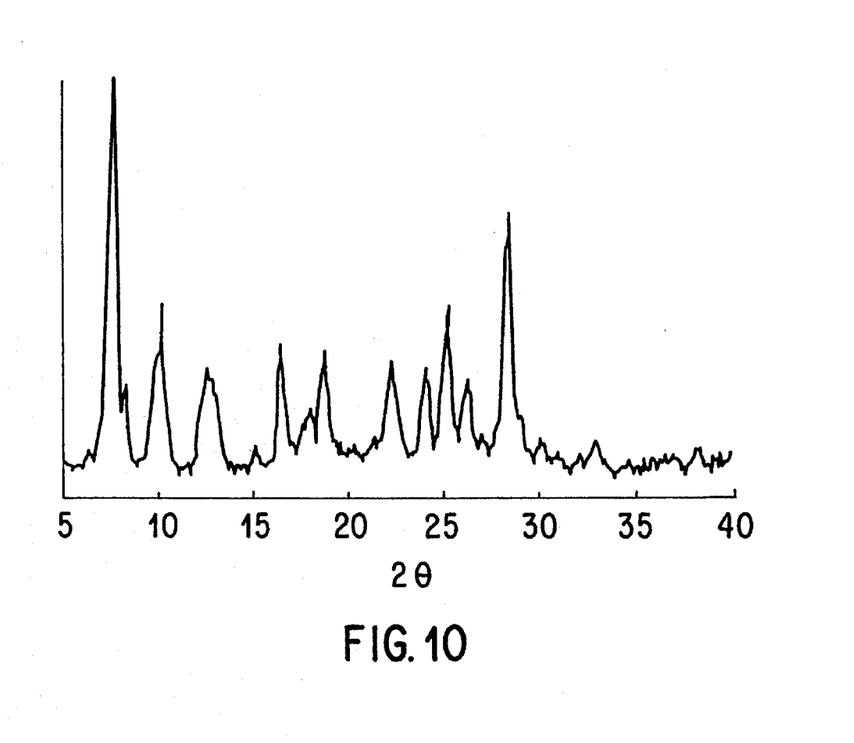
Figure 11:
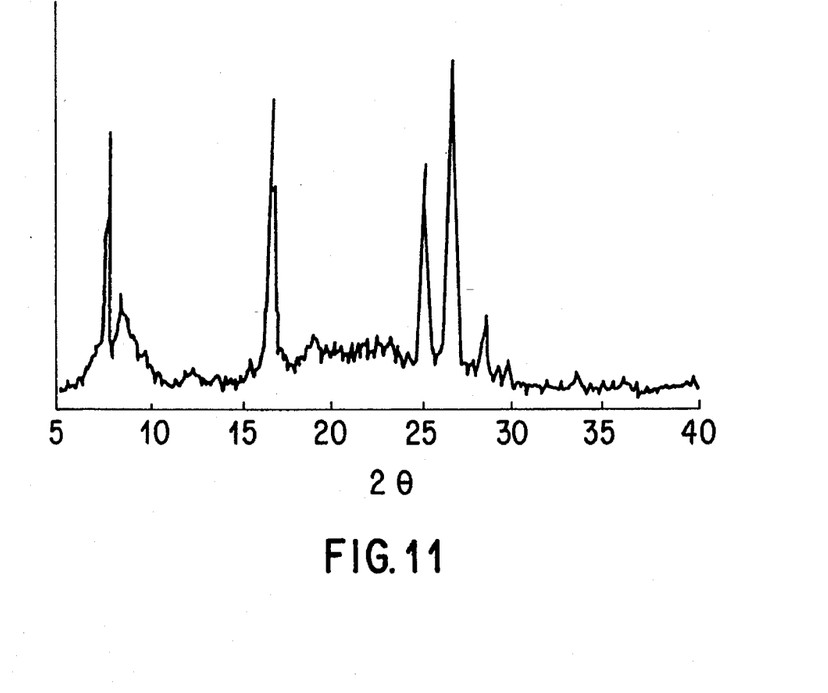
Figure 12:
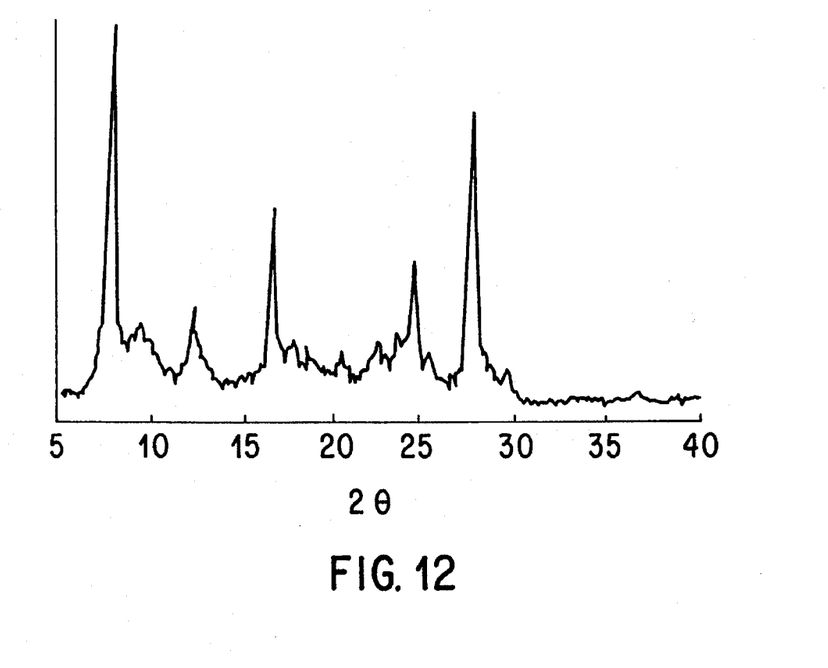
Figure 13:
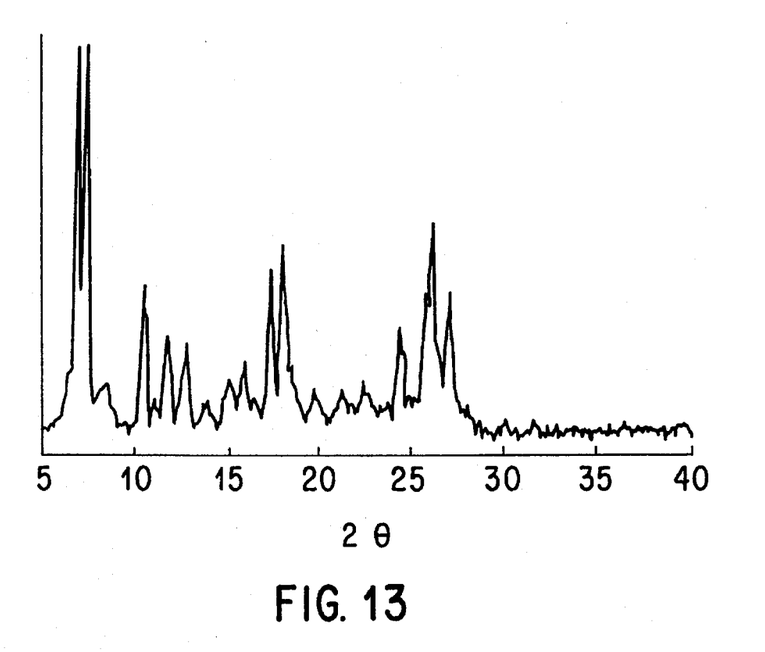
Figure 14:
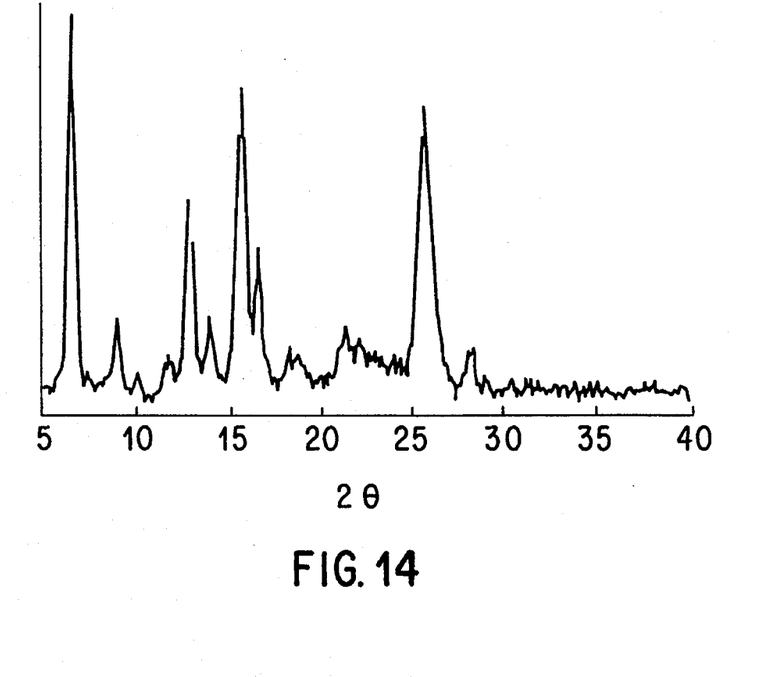

| Synthesis Example No. | Solvent | X Ray Diffraction Pattern |
|---|---|---|
| 4 | DMF | FIG. 10 |
| 5 | methanol | FIG. 11 |
| 6 | dimethyl sulfoxide | FIG. 12 |
| 7 | benzyl alcohol | FIG. 13 |
| 8 | ethylene glycol | FIG. 14 |

SYNTHESIS EXAMPLE 9

Six parts of the chlorogallium phthalocyanine obtained in Synthesis Example 3 were dissolved in 180 parts of concentrated sulfuric acid at 0° C., and the solution was added dropwise to 900 parts of distilled water at 5° C. to precipitate crystals. The resulting crystals were washed with distilled water and dried to obtain 5.2 parts of hydroxygallium phthalocyanine crystals containing the residual acid.

Figure 15:
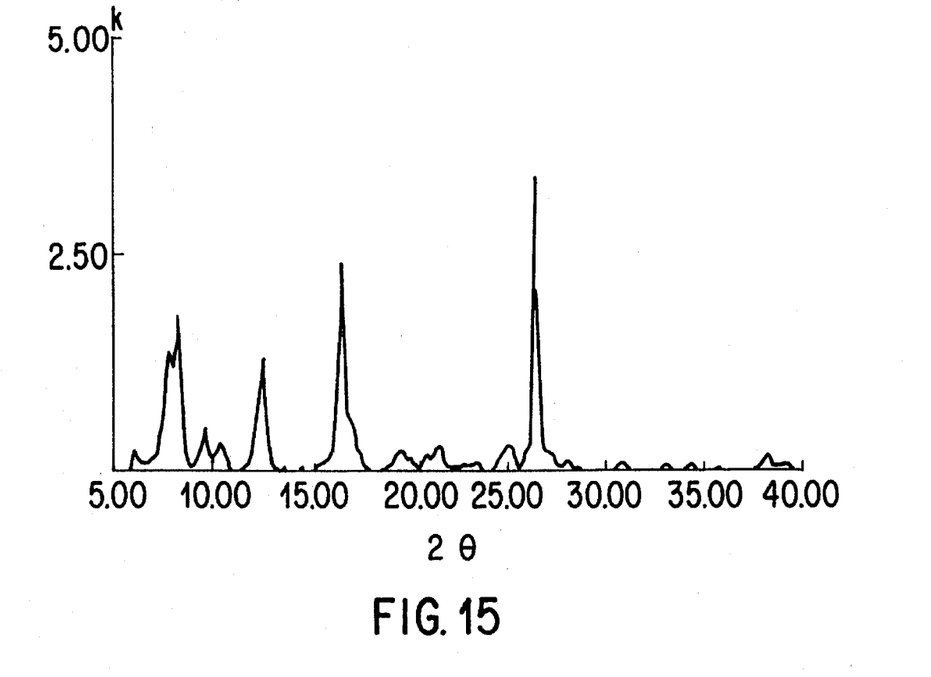

Two parts of the resulting crystals were milled in 60 parts of DMF together with 120 parts of glass beads (diameter: 1 mm) in a ball mill for 24 hours. The crystals were separated, washed with butyl acetate, and dried to obtain hydroxygallium phthalocyanine crystals. The powder X-ray diffraction pattern of the crystal is shown in FIG. 15.

SYNTHESIS EXAMPLE 10

Synthesis of Dihydroxysilicon Phthalocyanine

To 150 parts of quinoline were added 30 parts of 1,3-diiminoisoindoline and 20 parts of silicon tetrachloride, and the mixture was allowed to react at 200° C. for 3 hours in a nitrogen atmosphere. The reaction product was collected by filtration, washed successively with acetone and methanol, and heat-refluxed in 80 parts of acetone. The crystals collected by filtration were dried to obtain 20 parts of dichlorosilicon phthalocyanine.

Three parts of the resulting crystal were dissolved in 80 parts of concentrated sulfuric acid at 5° C., and the solution was slowly added dropwise to 450 parts of distilled water at 0° C. to precipitate crystals. The thus formed crystals were collected by filtration, washed successively with distilled water, dilute aqueous ammonia, and distilled water, and dried to obtain 2.5 parts of dihydroxysilicon phthalocyanine.

Figure 16:
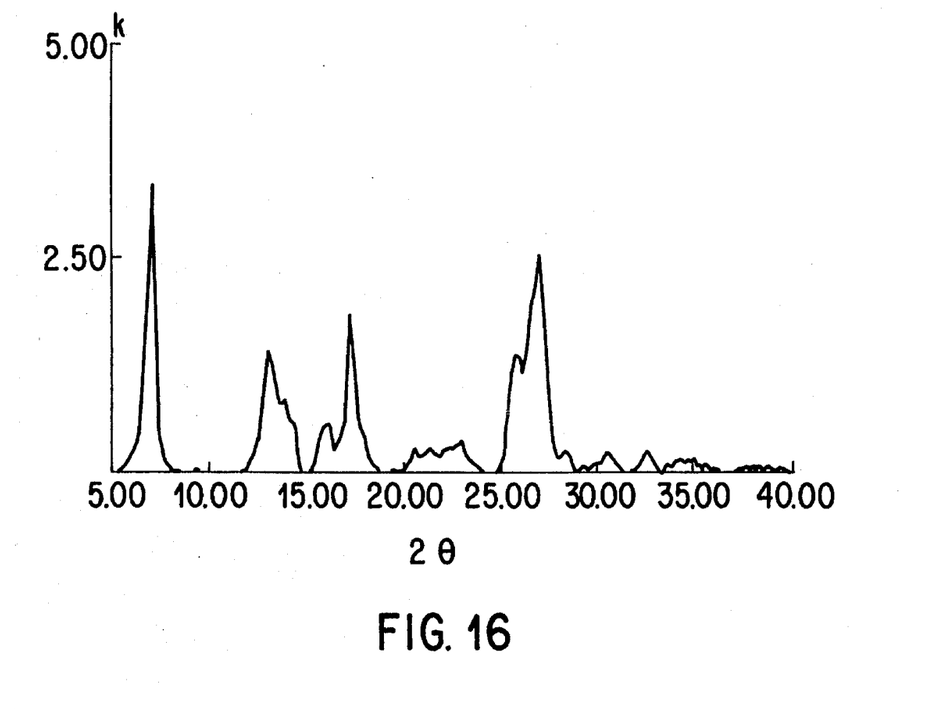
FIG. 16 is a powder X-ray diffraction pattern of the dihydroxysilicon phthalocyanine crystal obtained in Synthesis Example 10.

Two parts of the resulting crystal were milled in 60 parts of methylene chloride together with 100 parts of glass beads (diameter: 1 mm) in a ball mill for 24 hours, followed by filtration. The filter cake was washed with methylene chloride and dried to recover 1.8 parts of dihydroxysilicon phthalocyanine crystals. The powder X-ray diffraction pattern of the crystal is shown in FIG. 16.

SYNTHESIS EXAMPLE 11

Synthesis of Dihydroxygermanium Phthalocyanine

To 200 parts of quinoline were added 30 parts of 1,3-diiminoisoindoline and 11 parts of germanium tetrachloride, and the mixture was allowed to react at 200° C. for 3 hours in a nitrogen atmosphere. The reaction product was collected by filtration, washed successively with acetone and quinoline, and heat-refluxed in 100 parts of acetone. The crystals collected by filtration were dried to obtain 29 parts of dichlorogermanium phthalocyanine.

Three parts of the resulting crystal were dissolved in 80 parts of concentrated sulfuric acid at 5° C., and the solution was slowly added dropwise to 450 parts of distilled water at 0° C. to precipitate crystals. The thus formed crystals were collected by filtration, washed successively with distilled water, dilute aqueous ammonia, and distilled water, and dried to obtain 3.3 parts of dihydroxygermanium phthalocyanine.

Figure 17:
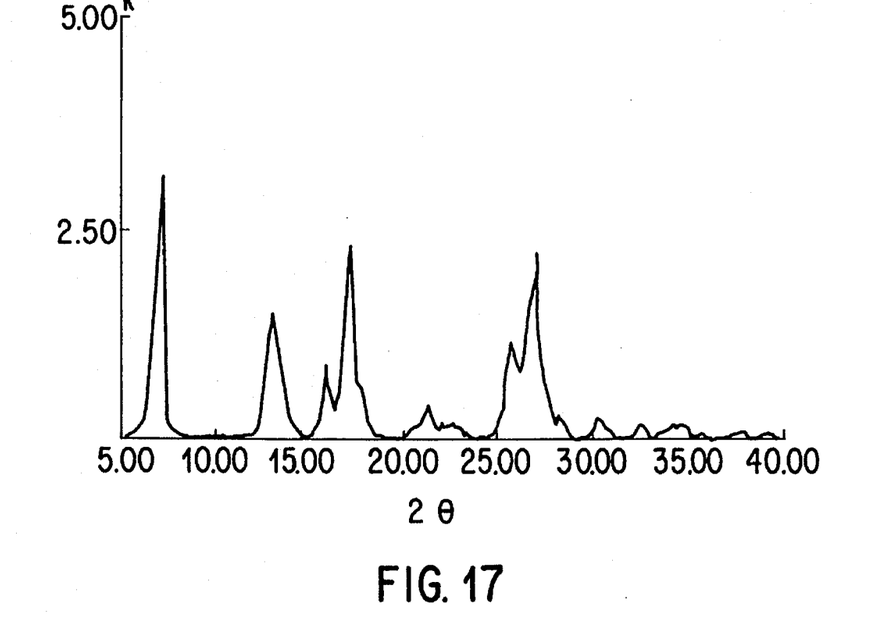
FIG. 17 is a powder X-ray diffraction pattern of the dihydroxygermanium phthalocyanine crystal obtained in Synthesis Example 11.

Two parts of the resulting crystal were milled in 60 parts of methylene chloride together with 100 parts of glass beads (diameter: 1 mm) in a ball mill for 24 hours, followed by filtration. The filter cake was washed with methylene chloride and dried to recover 1.8 parts of dihydroxygermanium phthalocyanine crystals. The powder X-ray diffraction pattern of the crystal is shown in FIG. 17.

SYNTHESIS EXAMPLE 12

Synthesis of Dihydroxytin Phthalocyanine

To 150 parts of quinoline were added 30 parts of 1,3-diiminoisoindoline and 10 parts of tin dichloride, and the mixture was allowed to react at 200° C. for 3 hours in a nitrogen atmosphere. The reaction product was collected by filtration, washed with quinoline, and heat-refluxed in 120 parts of acetone. The crystals collected by filtration were dried to obtain 31 parts of dihydroxytin phthalocyanine.

Five parts of the resulting crystal were added to a mixture of 1.25 parts of sodium hydroxide, 30 parts of pyridine, and 110 parts of distilled water, followed by stirring at reflux for 7 hours. The crystals were filtered, washed with distilled water, and dried to recover 3 parts of dihydroxytin phthalocyanine.

Figure 18:
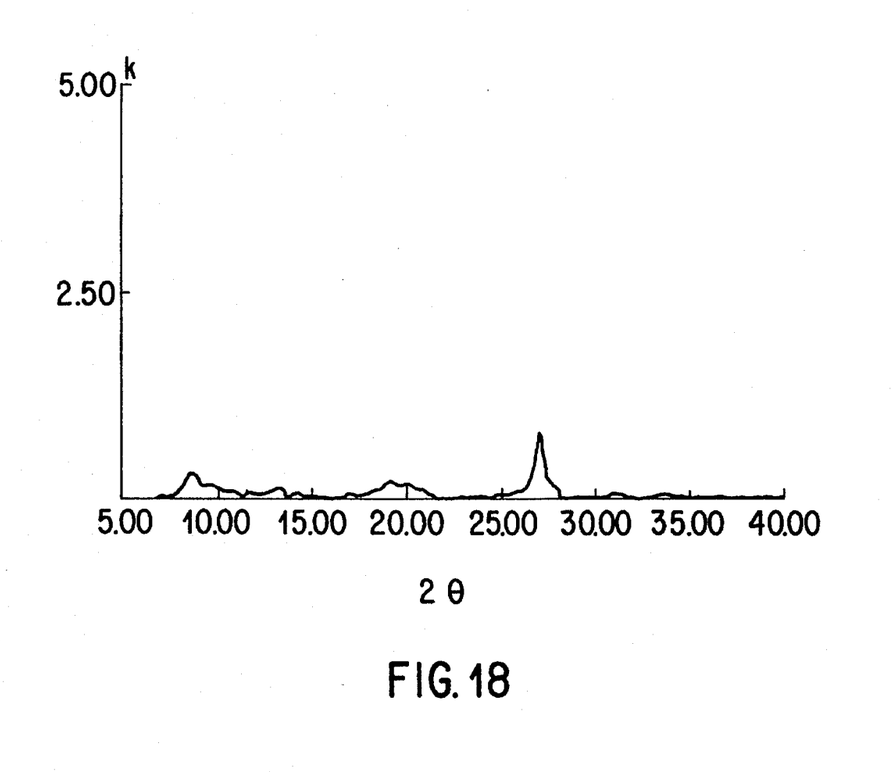
FIG. 18 is a powder X-ray diffraction pattern of the dihydroxytin phthalocyanine crystal obtained in Synthesis Example 12.
Figure 19:
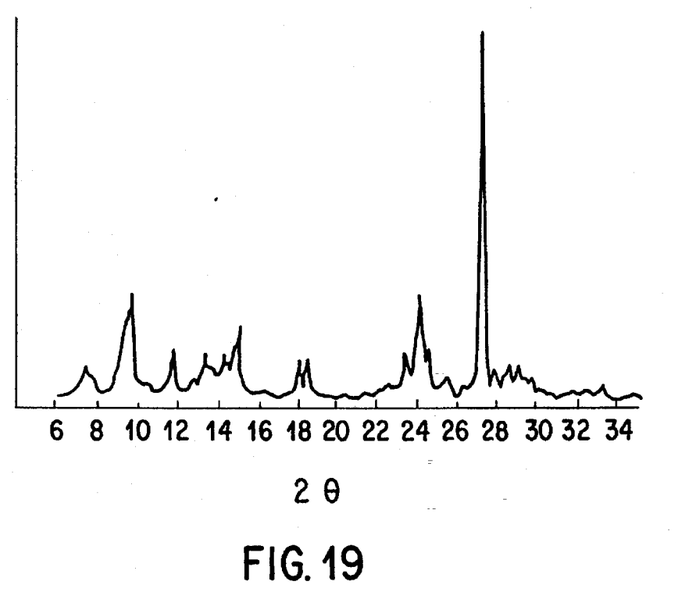
FIG. 19 is a powder X-ray diffraction pattern of the oxytitanium phthalocyanine used in Comparative Example 13.
Figure 20:
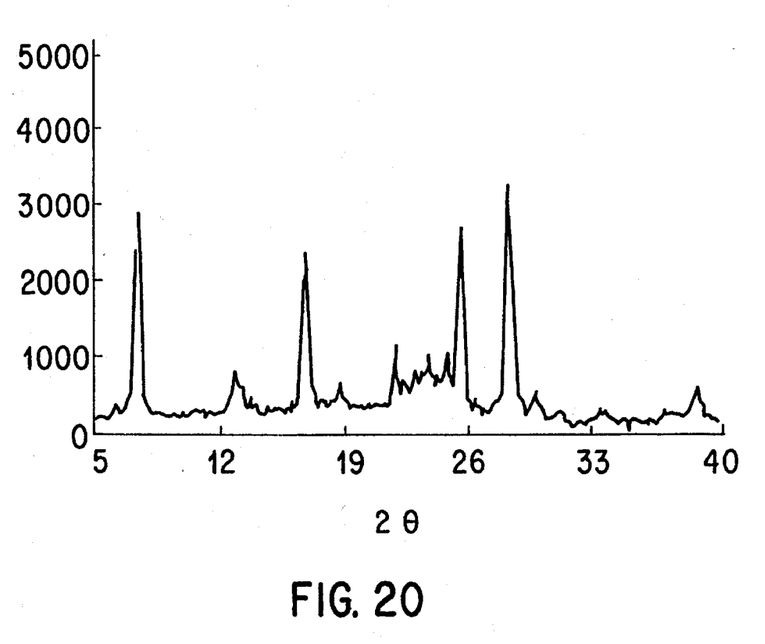
FIG. 20 is a powder X-ray diffraction pattern of the chlorotitanium phthalocyanine used in Comparative Example 14.

Two parts of the resulting dihydroxytin phthalocyanine were milled in 60 parts of ethylene glycol together with 100 parts of glass beads (diameter: 1 mm) in a ball mill for 24 hours, followed by filtration. The filter cake was washed with methanol and dried to recover 1.8 parts of dihydroxytin phthalocyanine crystals. The powder X-ray diffraction pattern of the crystal is shown in FIG. 18.

EXAMPLE 1

A solution consisting of 10 parts of a zirconium compound (Orgatics ZC540 produced by Matsumoto Seiyaku K. K.), 1 part of a silane compound (A 1110 produced by Nippon Unicar Co., Ltd.), 40 parts of isopropyl alcohol, and 20 parts of n-butanol was coated on an aluminum substrate by dip coating and dried by heating at 120° C. for 10 minutes to form a subbing layer having a thickness of 0.5 μm.

One part of the hydroxyaluminum phthalocyanine obtained in Synthesis Example 1 was mixed with 0.1 part of γ-methacryloxypropyltrimethoxysilane (KBM503 produced by Shin-Etsu Chemical Industry Co., Ltd.) and 0.9 part of methanol, and the mixture was dispersed in a paint shaker together with glass beads for 1 hour, followed by heating at 100° C. for 1 hour. The dispersion was further mixed with 1 part of a polyvinyl butyral resin (S-Lec BM-S produced by Sekisui Chemical Co., Ltd.) and 100 parts of n-butyl acetate, and the mixture was dispersed in a paint shaker together with glass beads for 1 hour. The resulting coating composition was coated on the subbing layer by dip coating and dried by heating at 100° C. for 10 minutes to form a charge generating layer having a thickness of 0.15 μm. X-Ray diffractiometry of the hydroxyaluminum phthalocyanine crystals in the coating composition revealed that the crystal form had not changed on being dispersed.

In 20 parts of monochlorobenzene were dissolved 2 parts of N,N'-diphenyl-N,N'-bis(m-tolyl)benzidine represented by formula (1):

and 3 parts of poly(cyclohexylidene-4,4'-diphenylene)carbonate (viscosity-average molecular weight: 39,000) represented by formula (2):

and the resulting coating composition was coated on the charge generating layer by dip coating and dried by heating at 120° C. for 1 hour to form a charge transporting layer having a thickness of 20 μm. There was thus prepared an electrophotographic photoreceptor having a laminate structure.

EXAMPLE 2

An electrophotographic photoreceptor was prepared in the same manner as in Example 1, except for replacing γ-methacryloxypropyltrimethoxysilane with a titanium coupling agent, dipropoxy-bis(acetylacetonato)titanium (Orgatics TC-100).

EXAMPLE 3

An electrophotographic photoreceptor was prepared in the same manner as in Example 1, except for replacing γ-methacryloxypropyltrimethoxysilane with a zirconium compound (Orgatics ZC540) represented by formula (3):

EXAMPLE 4

An electrophotographic photoreceptor was prepared in the same manner as in Example 1, except for replacing hydroxyaluminum phthalocyanine with the hydroxyindium phthalocyanine obtained in Synthesis Example 2.

EXAMPLE 5

An electrophotographic photoreceptor was prepared in the same manner as in Example 1, except for replacing hydroxyaluminum phthalocyanine with the hydroxygallium phthalocyanine obtained in Synthesis Example 3.

EXAMPLE 6

An electrophotographic photoreceptor was prepared in the same manner as in Example 1, except for replacing hydroxyaluminum phthalocyanine with the hydroxygallium phthalocyanine obtained in Synthesis Example 4.

EXAMPLE 7

An electrophotographic photoreceptor was prepared in the same manner as in Example 1, except for replacing hydroxyaluminum phthalocyanine with the hydroxygallium phthalocyanine obtained in Synthesis Example 5.

EXAMPLE 8

An electrophotographic photoreceptor was prepared in the same manner as in Example 1, except for replacing hydroxyaluminum phthalocyanine with the hydroxygallium phthalocyanine obtained in Synthesis Example 6.

EXAMPLE 9

An electrophotographic photoreceptor was prepared in the same manner as in Example 1, except for replacing hydroxyaluminum phthalocyanine with the hydroxygallium phthalocyanine obtained in Synthesis Example 7.

EXAMPLE 10

An electrophotographic photoreceptor was prepared in the same manner as in Example 1, except for replacing hydroxyaluminum phthalocyanine with the hydroxygallium phthalocyanine obtained in Synthesis Example 8.

EXAMPLE 11

An electrophotographic photoreceptor was prepared in the same manner as in Example 1, except for replacing hydroxyaluminum phthalocyanine with the hydroxygallium phthalocyanine obtained in Synthesis Example 9.

EXAMPLE 12

An electrophotographic photoreceptor was prepared in the same manner as in Example 1, except for replacing hydroxyaluminum phthalocyanine with the dihydroxysilicon phthalocyanine obtained in Synthesis Example 10.

EXAMPLE 13

An electrophotographic photoreceptor was prepared in the same manner as in Example 1, except for replacing hydroxyaluminum phthalocyanine with the dihydroxygermanium phthalocyanine obtained in Synthesis Example 11.

EXAMPLE 14

An electrophotographic photoreceptor was prepared in the same manner as in Example 1, except for replacing hydroxyaluminum phthalocyanine with the dihydroxytin phthalocyanine obtained in Synthesis Example 12.

COMPARATIVE EXAMPLE 1

An electrophotographic photoreceptor was prepared in the same manner as in Example 1, except for using the hydroxyaluminum phthalocyanine as obtained in Synthesis Example 1 (untreated with the organosilane compound) as a charge generating material.

COMPARATIVE EXAMPLE 2

An electrophotographic photoreceptor was prepared in the same manner as in Example 4, except for using the hydroxyindium phthalocyanine as obtained in Synthesis Example 2 (untreated with the organosilane compound) as a charge generating material.

COMPARATIVE EXAMPLE 3

An electrophotographic photoreceptor was prepared in the same manner as in Example 5, except for using the hydroxygallium phthalocyanine as obtained in Synthesis Example 3 (untreated with the organosilane compound) as a charge generating material.

COMPARATIVE EXAMPLE 4

An electrophotographic photoreceptor was prepared in the same manner as in Example 6, except for using the hydroxygallium phthalocyanine as obtained in Synthesis Example 4 (untreated with the organosilane compound) as a charge generating material.

COMPARATIVE EXAMPLE 5

An electrophotographic photoreceptor was prepared in the same manner as in Example 7, except for using the hydroxygallium phthalocyanine as obtained in Synthesis Example 5 (untreated with the organosilane compound) as a charge generating material.

COMPARATIVE EXAMPLE 6

An electrophotographic photoreceptor was prepared in the same manner as in Example 8, except for using the hydroxygallium phthalocyanine as obtained in Synthesis Example 6 (untreated with the organosilane compound) as a charge generating material.

COMPARATIVE EXAMPLE 7

An electrophotographic photoreceptor was prepared in the same manner as in Example 9, except for using the hydroxygallium phthalocyanine as obtained in Synthesis Example 7 (untreated with the organosilane compound) as a charge generating material.

COMPARATIVE EXAMPLE 8

An electrophotographic photoreceptor was prepared in the same manner as in Example 10, except for using the hydroxygallium phthalocyanine as obtained in Synthesis Example 8 (untreated with the organosilane compound) as a charge generating material.

COMPARATIVE EXAMPLE 9

An electrophotographic photoreceptor was prepared in the same manner as in Example 11, except for using the hydroxygallium phthalocyanine as obtained in Synthesis Example 9 (untreated with the organosilane compound) as a charge generating material.

COMPARATIVE EXAMPLE 10

An electrophotographic photoreceptor was prepared in the same manner as in Example 12, except for using the dihydroxysilicon phthalocyanine as obtained in Synthesis Example 10 (untreated with the organosilane compound) as a charge generating material.

COMPARATIVE EXAMPLE 11

An electrophotographic photoreceptor was prepared in the same manner as in Example 13, except for using the dihydroxygermanium phthalocyanine as obtained in Synthesis Example 11 (untreated with the organosilane compound) as a charge generating material.

COMPARATIVE EXAMPLE 12

An electrophotographic photoreceptor was prepared in the same manner as in Example 14, except for using the dihydroxytin phthalocyanine as obtained in Synthesis Example 12 (untreated with the organosilane compound) as a charge generating material.

Each of the electrophotographic photoreceptors prepared in Example 1 to 14 and Comparative Example 1 to 12 was evaluated for electrophotographic characteristics as follows. A flat plate scanner produced by Fuji Xerox Co., Ltd. was used as a testing machine.

The photoreceptor was charged to an initial surface potential $V_0$ (V) by a corona discharge of $-2.5$ µA. After 1 second, the dark potential $V_{DDP}$ (V) was measured to obtain a dark decay rate DDR (DDR=$(V_0-V_{DDP})/V_0\times100(\%)$)- The photoreceptor was then exposed to monochromatic light of 780 nm which was isolated from light emitted from a tungsten lamp by means of a monochromator and adjusted to 0.25 µmW/cm$^2$ on the surface of the photoreceptor. The initial sensitivity dV/dE (V.cm$^2$/erg) was measured.

Further, each photoreceptor was mounted on a laser printer (XP-11, manufactured by Fuji Xerox Co., Ltd.), and durability test was carried out under a high temperature and high humidity condition (28° C., 85% RH) to take 10,000 copies, and the image quality of the resulting copies was observed.

The results of evaluation are shown in Table 2 below. In Table 2, the abbreviations Ex. and C.Ex. mean Example and Comparative Example, respectively.

TABLE 2

| Example No. | Initial Characteristics | | | | Image Quality |
| --- | --- | --- | --- | --- | --- |
| | $V_O$ (V) | $V_{DDP}$ (V) | DDR (%) | dV/dB (v · cm$^2$/erg) | After Obtaining 10,000 Copies |
| Ex. 1 | −603 | −567 | 6.0 | 201 | no image defect |
| Ex. 2 | −575 | −535 | 7.0 | 190 | no image defect |
| Ex. 3 | −592 | −549 | 7.3 | 188 | no image defect |
| Ex. 4 | −631 | −609 | 3.5 | 200 | no image defect |
| Ex. 5 | −533 | −489 | 8.3 | 113 | no image defect |
| Ex. 6 | −635 | −620 | 2.4 | 315 | no image defect |
| Ex. 7 | −610 | −591 | 3.1 | 268 | no image defect |

TABLE 2-continued

| | Initial Characteristics | | | | Image Quality |
|---|---|---|---|---|---|
| Example No. | $V_O$ (V) | $V_{DDP}$ (V) | DDR (%) | dV/dB (v · cm²/erg) | After Obtaining 10,000 Copies |
| Ex. 8 | −615 | −592 | 3.7 | 260 | no image defect |
| Ex. 9 | −600 | −561 | 6.5 | 201 | no image defect |
| Ex. 10 | −622 | −595 | 4.3 | 223 | no image defect |
| Ex. 11 | −613 | −590 | 3.8 | 215 | no image defect |
| Ex. 12 | −523 | −479 | 8.4 | 118 | no image defect |
| Ex. 13 | −580 | −544 | 6.2 | 166 | no image defect |
| Ex. 14 | −627 | −611 | 2.6 | 77 | no image defect |
| C. Ex. 1 | −576 | −531 | 7.8 | 183 | black spots |
| C. Ex. 2 | −625 | −601 | 3.8 | 191 | black spots |
| C. Ex. 3 | −506 | −415 | 10.9 | 103 | black spots |
| C. Ex. 4 | −631 | −610 | 3.3 | 198 | black spots |
| C. Ex. 5 | −603 | −582 | 3.5 | 245 | black spots |
| C. Ex. 6 | −615 | −589 | 4.2 | 240 | black spots |
| C. Ex. 7 | −595 | −554 | 6.8 | 196 | black spots |
| C. Ex. 8 | −609 | −580 | 4.8 | 213 | black spots |
| C. Ex. 9 | −603 | −579 | 4.0 | 209 | black spots |
| C. Ex. 10 | −515 | −472 | 8.3 | 112 | black spots |
| C. Ex. 11 | −575 | −541 | 5.9 | 163 | black spots |
| C. Ex. 12 | −615 | −598 | 2.8 | 71 | black spots |

COMPARATIVE EXAMPLE 13

Electrophotographic photoreceptors were prepared in the same manner as in Example 1, except for using oxytitanium phthalocyanine treated with the organosilane compound or non-treated oxytitanium phthalocyanine as a charge generating material. The photoreceptors were evaluated in the same manner as in Example 1. The results are shown in Table 3 below.

TABLE 3

| | Initial Characteristics | | | | Image Quality After Obtaining 10,000 Copies |
|---|---|---|---|---|---|
| | $V_O$ (V) | $V_{DDP}$ (V) | DDR (%) | dV/dB (v · cm²/erg) | |
| Treated | −630 | −615 | 2.4 | 320 | black spots |
| Non-treated | −635 | −620 | 2.4 | 318 | black spots |

COMPARATIVE EXAMPLE 14

Electrophotographic photoreceptors were prepared in the same manner as in Example 1, except for using chlorotitanium phthalocyanine treated with the organosilane compound or non-treated oxytitanium phthalocyanine as a charge generating material. The photoreceptors were evaluated in the same manner as in Example 1. The results are shown in Table 4 below.

TABLE 4

| | Initial Characteristics | | | | Image Quality After Obtaining 10,000 Copies |
|---|---|---|---|---|---|
| | $V_O$ (V) | $V_{DDP}$ (V) | DDR (%) | dV/dB (v · cm²/erg) | |
| Treated | −610 | −580 | 4.9 | 215 | black spots |
| Non-treated | −615 | −685 | 4.9 | 210 | black spots |

As described above, the electrophotographic photoreceptor of the present invention contains a hydroxymetal phthalocyanine pigment having been treated with an organometallic compound having a hydrolyzable functional group or a hydrolysis product thereof as a charge generating material. The present invention provides a hydroxymetal phthalocyanine pigment with excellent dispersibility and a dispersion thereof having excellent coating properties and preservability. As is apparent from the results in Table 2, the electrophotographic photoreceptors prepared by using the hydroxymetal phthalocyanine pigment dispersion shows improvements in photosensitivity, charge retention properties and image characteristics over those using the corresponding untreated hydroxymetal phthalocyanine pigment.

While the invention has been described in detail and with reference to specific examples thereof, it will be apparent to one skilled in the art that various changes and modifications can be made therein without departing from the spirit and scope thereof.

What is claimed is:

1. An electrophotographic photoreceptor comprising a conductive substrate having a photosensitive layer containing a pigment composition as a charge generating material, said pigment composition comprising a phthalocyanine compound and 0.001 to 0.3 part by weight of an organometallic compound containing a metal atom having a hydrolyzable functional group or a hydrolysis product thereof per part by weight of the phthalocyanine compound, wherein said organometallic compound is chemically bonded to said phthalocyanine compound through a coupling reaction with a hydroxy group of the phthalocyanine compound and said phthalocyanine compound is represented by formula (I):

wherein Me represents Al, Ga, In, Si, Ge or Sn; X represents H, Cl, Br or I; m represents an integer of from 1 to 4; and n represents 1 where Me is Al, Ga or In, or 2 where Me is Si, Ge or Sn.

2. An electrophotographic photoreceptor as claimed in claim 1, wherein said phthalocyanine compound has been coated with said organometallic compound having a hydrolyzable functional group or a hydrolysis product thereof.

3. A electrophotographic photoreceptor as claimed in claim 1, wherein said organometallic compound having a hydrolyzable functional group or a hydrolysis product thereof is at least one compound selected from the group consisting of an organotitanium compound, an organoaluminum compound, and an organozirconium compound.

4. An electrophotographic photoreceptor as claimed in claim 1, wherein said organometallic compound is bonded to said phthalocyanine compound to form a compound represented by formula (III):

wherein Me represents Al, Ga, In, Si, Ge or Sn; X represents H, Cl, Br or I; m represents an integer of from 1 to 4; n represents 1 where Me is Al, Ga or In, or 2 where Me is Si, Ge or Sn; Me' represents a metal; Z' represents a residual group of the hydrolyzable functional group; each Y' of $(Y')_{q-1}$ represents a residual group of a hydrolyzable functional group bonded to (1) a central metal or silicon of said phthalocyanine compound, (2) a central metal or silicon of one other of said phthalocyanine compound or (3) a metal of one other of said organometallic compound. R represents an organic group; and p and q each represent an integer of from 1 to 4, with the sum of them corresponding to the valence of Me'.

5. An electrophotographic photoreceptor as claimed in claim 1, wherein said photosensitive layer has a laminate structure composed of a charge generating layer and a charge transporting layer.

6. An electrophotographic photoreceptor as claimed in claim 1, wherein said organometallic compound is chemically bonded to at least one other said organometallic compound to form a polymer or oligomer of the organometallic compound.

7. An electrophotographic photoreceptor as claimed in claim 6, wherein more than one said phthalocyanine compound form an agglomeration that is coated with said polymer or oligomer.

8. An electrophotographic photoreceptor as claimed in claim 1, wherein said organometallic compound is chemically bonded to another organometallic compound.

9. An electrophotographic photoreceptor as claimed in claim 1, wherein said pigment contains 0.01 to 0.2 part by weight of the organometallic compound per part by weight of the phthalocyanine compound.

10. An electrophotographic photoreceptor comprising a conductive substrate having a photosensitive layer containing a pigment composition as a charge generating material, said pigment composition comprising a phthalocyanine compound and 0.001 to 0.3 part by weight of an organometallic compound containing a metal atom having a hydrolyzable functional group or a hydrolysis product thereof per part by weight of the phthalocyanine compound, wherein said organometallic compound is chemically bonded to at least one other said organometallic compound to form a polymer or oligomer of the organometallic compound and wherein said phthalocyanine compound is treated with said polymer or oligomer and is represented by formula (I):

wherein Me represents Al, Ga, In, Si, Ge or Sn; X represents H, Cl, Br or I; m represents an integer of from 1 to 4; and n represents 1 where Me is Al, Ga or In, or 2 where Me is Si, Ge or Sn.

11. An electrophotographic photoreceptor as claimed in claim 10, wherein said phthalocyanine compound is coated with said polymer or oligomer.

12. An electrophotographic photoreceptor as claimed in claim 10, wherein at least one said organometallic compound is chemically bonded to said phthalocyanine compound through a coupling reaction with a hydroxy group of the phthalocyanine compound.

13. An electrophotographic photoreceptor as claimed in claim 10, wherein said polymer or oligomer contains at least one compound selected from the group consisting of an organotitanium compound, an organoaluminum compound and an organozirconium compound.

14. A pigment dispersion for electrophotographic photoreceptors which comprises a binder resin, a solvent, a hydroxymetal or hydroxysilicon phthalocyanine compound and 0.001 to 0.3 part by weight of an organometallic compound containing a metal atom having a hydrolyzable functional group or a hydrolysis product thereof per part by weight of the phthalocyanine compounds wherein said organometallic compound is chemically bonded to said phthalocyanine compound through a coupling reaction with a hydroxy group of the phthalocyanine compound.

15. A pigment dispersion as claimed in claim 14, wherein said phthalocyanine compound is represented by Formula (I):

wherein Me represents Al, Ga, In, Si, Ge or Sn; X represents H, Cl Br or I; m represents an integer of from 1 to 4; and n represents 1 where Me is Al, Ga or In, or 2 where Me is Si, Ge or Sn.

16. A pigment dispersion as claimed in claim 14, wherein said phthalocyanine compound is coated with said organometallic compound.

17. A pigment dispersion for electrophotographic photoreceptors which comprises a binder resin, a solvent, a hydroxymetal or hydroxysilicon phthalocyanine compound and 0.001 to 0.3 part by weight of an organometallic compound containing a metal atom having a hydrolyzable functional group or a hydrolysis product thereof per part by weight of the phthalocyanine compound, wherein said organometallic compound is chemically bonded to at least one other said organometallic compound to form a polymer or oligomer of the organometallic compound and wherein said phthalocyanine compound is treated with said polymer or oligomer.

18. The pigment dispersion as claimed in claim 17, wherein said phthalocyanine compound is coated with said polymer or oligomer.

19. The pigment dispersion as claimed in claim 17, wherein at least one said organometallic compound is chemically bonded to said phthalocyanine compound through a coupling reaction with a hydroxy group of the phthalocyanine compound.

* * * * *